US012217895B2

(12) United States Patent
Kobayashi et al.

(10) Patent No.: US 12,217,895 B2
(45) Date of Patent: Feb. 4, 2025

(54) REACTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takehito Kobayashi, Mie (JP); Kohei Yoshikawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 703 days.

(21) Appl. No.: 17/611,718

(22) PCT Filed: May 15, 2020

(86) PCT No.: PCT/JP2020/019530
§ 371 (c)(1),
(2) Date: Nov. 16, 2021

(87) PCT Pub. No.: WO2020/241325
PCT Pub. Date: Dec. 3, 2020

(65) Prior Publication Data

US 2022/0215996 A1 Jul. 7, 2022

(30) Foreign Application Priority Data

May 24, 2019 (JP) ................................ 2019-098078
Oct. 31, 2019 (JP) ................................ 2019-199278

(51) Int. Cl.
*H01F 27/28* (2006.01)
*H01F 27/02* (2006.01)
(Continued)

(52) U.S. Cl.
CPC ........... *H01F 27/022* (2013.01); *H01F 27/06* (2013.01); *H01F 27/26* (2013.01); *H01F 37/00* (2013.01); *H01F 41/127* (2013.01)

(58) Field of Classification Search
CPC ........ H01F 27/022; H01F 27/06; H01F 27/26; H01F 37/00; H01F 41/127; H01F 27/02; H01F 27/266; H01F 27/306; H01F 27/025
(Continued)

(56) References Cited

U.S. PATENT DOCUMENTS

2002/0014941 A1* 2/2002 Yoshioka .............. H01F 27/266 336/184
2010/0026434 A1* 2/2010 Okamoto .............. H01F 27/266 336/65
(Continued)

FOREIGN PATENT DOCUMENTS

JP 2012-227493 A 11/2012
JP 2013-131567 A 7/2013
JP 2017-028084 A 2/2017

OTHER PUBLICATIONS

International Search Report issued on Aug. 4, 2020 for WO 2020/241325 A1 (4 pages).

*Primary Examiner* — Shawki S Ismail
*Assistant Examiner* — Kazi S Hossain
(74) *Attorney, Agent, or Firm* — Venjuris, P.C.

(57) ABSTRACT

A reactor is provided with a coil including a pair of winding portions, a magnetic core to be arranged inside and outside the winding portions, a holding member for specifying
(Continued)

mutual positions of the coil and the magnetic core, a case for accommodating an assembly including the coil, the magnetic core and the holding member, and a sealing resin portion to be filled into the case. The case includes a bottom plate portion on which the assembly is placed, a side wall portion for surrounding the assembly, and an opening facing the bottom plate portion. The side wall portion includes a pair of long side parts facing each other and a pair of short side parts facing each other. The assembly is so accommodated into the case that an axial direction of each winding portion is along a depth direction of the case.

4 Claims, 8 Drawing Sheets

(51) Int. Cl.
*H01F 27/06* (2006.01)
*H01F 27/26* (2006.01)
*H01F 37/00* (2006.01)
*H01F 41/12* (2006.01)

(58) Field of Classification Search
USPC ................................ 336/90, 55–60, 83, 221
See application file for complete search history.

(56) References Cited

U.S. PATENT DOCUMENTS

| | | | | |
|---|---|---|---|---|
| 2012/0194311 | A1* | 8/2012 | Suzuki .................. | H01F 27/266 336/92 |
| 2013/0106556 | A1* | 5/2013 | Suzuki .................. | H01F 27/306 336/212 |
| 2014/0292456 | A1* | 10/2014 | Suzuki .................... | H01F 27/29 336/55 |
| 2017/0112013 | A1* | 4/2017 | Baik ..................... | H01F 27/266 |
| 2018/0075964 | A1* | 3/2018 | Suzuki .................. | H01F 27/263 |
| 2018/0190421 | A1* | 7/2018 | Yoshikawa ........... | H01F 27/025 |
| 2019/0131052 | A1 | 5/2019 | Kusawake et al. | |

* cited by examiner

REACTOR

CROSS REFERENCE TO RELATED APPLICATIONS

This application is a national phase of PCT application No. PCT/JP2020/019530, filed on 15 May 2020, which claims priority from Japanese patent application Nos. 2019-098078 and 2019-199278 filed on 24 May 2019 and 31 Oct. 2019, respectively, all of which are incorporated herein by reference.

TECHNICAL FIELD

The present disclosure relates to a reactor.

BACKGROUND

Patent Document 1 discloses a reactor including a coil, a magnetic core, a case for accommodating an assembly of the coil and the magnetic core and a sealing resin for covering the outer periphery of the assembly by being filled into the case. It is described in Patent Document 1 that a resin introduction path for filling the sealing resin from a bottom side toward an opening side of the case is provided in a side wall portion of the case.

PRIOR ART DOCUMENT

Patent Document

Patent Document 1: JP 2013-131567 A

SUMMARY OF THE INVENTION

Problems to be Solved

A reactor of the present disclosure is provided with a coil including a pair of winding portions arranged in parallel, a magnetic core to be arranged inside and outside the winding portions, a holding member for specifying mutual positions of the coil and the magnetic core, a case for accommodating an assembly including the coil, the magnetic core and the holding member, and a sealing resin portion to be filled into the case, wherein the case includes a bottom plate portion, the assembly being placed on the bottom plate portion, a side wall portion in the form of a rectangular tube for surrounding the assembly, and an opening facing the bottom plate portion, the side wall portion includes a pair of long side parts facing each other and a pair of short side parts facing each other, the assembly is so accommodated into the case that an axial direction of each winding portion is along a depth direction of the case, the magnetic core includes an outer core portion to be arranged outside the winding portions and on the opening side, the holding member includes an outer wall portion for covering at least a part of an outer peripheral surface of the outer core portion and a protruding portion projecting from the outer wall portion toward one of the short side parts, and a clearance is provided between at least one of the long side parts and the protruding portion when the case is viewed from above.

DETAILED DESCRIPTION TO EXECUTE THE INVENTION

Figure 1A:
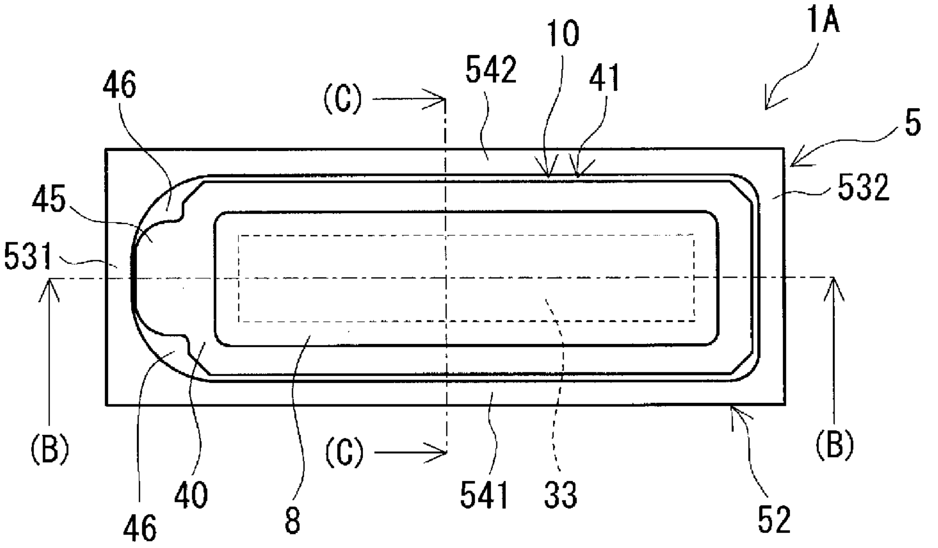
FIG. 1A is a schematic plan view of a reactor according to the first embodiment.

Further miniaturization of reactors is desired. The miniaturization of a reactor here means a small installation area of the reactor and a small interval between an assembly and a case. Further improvement in the productivity of reactors is also desired. In the reactor described in Patent Document 1, the resin introduction path for filling the sealing resin is provided in the side wall portion of the case. However, as a matter of practice, if the resin introduction path is provided in the side wall portion of the case, the manufacturing cost of the case may increase due to a need for special processing to form the resin introduction path and the like. If the resin introduction paths are provided in four corners of the case as described in Patent Document 1, it may lead to the enlargement of the case. Therefore, a structure is desired which can satisfactorily fill the sealing resin while realizing the miniaturization of the reactor.

One object of the present disclosure is to provide a reactor small in size and excellent in productivity.

Effect of Present Disclosure

The reactor of the present disclosure is small in size and excellent in productivity.

Description of Embodiments of Present Disclosure

First, embodiments of the present disclosure are listed and described.

(1) A reactor according to an embodiment of the present disclosure is provided with a coil including a pair of winding portions arranged in parallel, a magnetic core to be arranged inside and outside the winding portions, a holding member for specifying mutual positions of the coil and the magnetic core, a case for accommodating an assembly including the coil, the magnetic core and the holding member, and a sealing resin portion to be filled into the case, wherein the case includes a bottom plate portion, the assembly being placed on the bottom plate portion, a side wall portion in the form of a rectangular tube for surrounding the assembly, and an opening facing the bottom plate portion, the side wall portion includes a pair of long side parts facing each other and a pair of short side parts facing each other, the assembly is so accommodated into the case that an axial direction of each winding portion is along a depth direction of the case, the magnetic core includes an outer core portion to be arranged outside the winding portions and on the opening side, the holding member includes an outer wall portion for covering at least a part of an outer peripheral surface of the outer core portion and a protruding portion projecting from the outer wall portion toward one of the short side parts, and a clearance is provided between at least one of the long side parts and the protruding portion when the case is viewed from above.

In the reactor of the present disclosure, the assembly is so accommodated into the case that the axial direction of each winding portion in the coil is along the depth direction of the case. This arrangement mode is called an upright type below. On the other hand, in the reactor described in Patent Document 1, the assembly is so accommodated into the case that the parallel direction of the pair of winding portions and the axial direction of each winding portion are parallel to a bottom plate portion. This arrangement mode is called a horizontally placed type below. If the arrangement mode of the assembly is the upright type, an installation area of the assembly with respect to the bottom plate portion of the case can be reduced as compared to the horizontally placed type. This is because a length of an assembly along a direction orthogonal to both a parallel direction of a pair of winding portions and axial directions of the both winding portions is generally shorter than a length of the assembly along the axial directions of the both winding portions. Thus, the reactor of the present disclosure is thin and small in size. Therefore, the reactor of the present disclosure can reduce an area of the bottom plate portion and reduce the installation area.

Further, if the arrangement mode of the assembly is the upright type, a large facing area of the both winding portions and the case can be secured as compared to the horizontally placed type. Thus, in the reactor of the present disclosure, the case can be efficiently utilized as a heat dissipation path. Therefore, the reactor of the present disclosure easily dissipates the heat of the coil to the case and is excellent in heat dissipation.

In the reactor of the present disclosure, the holding member located on the opening side of the case includes the protruding portion projecting toward the one short side part in the side wall portion. The reactor of the present disclosure includes the clearance between at least one of the long side parts and the protruding portion when the case is viewed from above. In the reactor of the present disclosure, by providing the clearance between the long side part and the protruding portion, a resin, which will become the sealing resin portion, can be filled into the case through the clearance with the assembly accommodated into the case in forming the sealing resin portion. For example, the resin can be filled into the case by inserting a nozzle for injecting the resin into the clearance and injecting the resin from the bottom plate portion side of the case through the nozzle.

The size of the clearance can be adjusted according to the size of the protruding portion and a clearance enabling the insertion of a nozzle having a large diameter can also be easily formed. If the diameter of the nozzle is large, an operation of filling the resin, which will become the sealing resin portion, can be efficiently performed. Thus, the reactor of the present disclosure is excellent in productivity.

Besides, in the reactor of the present disclosure, the following effects can be expected by providing the protruding portion on the holding member and providing the clearance between the long side part and the protruding portion.

(a) In forming the sealing resin portion, the resin can be injected by inserting the nozzle into the clearance. Thus, it is not necessary to provide a resin introduction path in the side wall portion of the case, and the case needs not be specially processed. Therefore, the manufacturing cost of the case can be reduced.

(b) The protruding portion is provided on the holding member only on the side of the one short side part, and the clearance is formed only on the side of the one short side part. Thus, the case can be reduced in size as compared to the case where the protruding portion is also provided on the side of the other short side part and the clearances are formed on the sides of the both short side parts.

(c) In the case of injecting the resin by inserting the nozzle into the clearance, the resin is injected from the side of the one short side part and flows toward the side of the other short side part. Specifically, the resin injected from the nozzle flows from the side of the one short side part between the assembly and the long side parts and merges on the side of the other short side part. Thus, a merging point of the resin is created at a location distant from a location where the resin was injected. In this case, air bubbles mixed into the resin float up and the air bubbles in the resin are easily removed while the resin is flowing from the side of the one short side part toward the side of the other short side part. Thus, by injecting the resin from the side of the one short side part, the remaining of air bubbles in the sealing resin portion can be reduced. Further, if the resin is injected from the side of the one short side part, the merging point of the resin is one location on the side of the other short side part. Since the entrainment of air bubbles easily occurs at the merging point of the resin, less merging points are preferable. Since the resin merges at one location by injecting the resin from the side of one short side part, the remaining of air bubbles is easily reduced.

(2) As one form of the above reactor, a tip of the protruding portion in a projecting direction is in contact with an inner surface of the short side part.

In the reactor of the present disclosure, the assembly can be positioned with respect to the case since the holding member includes the protruding portion. Particularly, by the contact of the protruding portion with the inner surface of the short side part, a position shift of the assembly caused by the flow of the resin can be suppressed when the resin, which will become the sealing resin portion, is filled into the case. Thus, because of the contact of the protruding portion with the inner surface of the short side part, the reactor of the present disclosure is more excellent in the productivity.

(3) As one form of the above reactor, the protruding portion has a first surface located on the bottom plate portion side, a second surface located on the opening side, and a hole penetrating through the first and second surfaces, and the sealing resin portion includes a first resin portion to be filled into the hole and a second resin portion continuous with the first resin portion, the second resin portion being provided in contact with the first and the second surfaces.

In the reactor of the present disclosure, the protruding portion includes the hole and a part of the sealing resin portion is filled into that hole, whereby the protruding portion and the sealing resin portion can be firmly joined and, consequently, the assembly and the sealing resin portion can be firmly joined. This is because the first resin portion filled in the hole and the second resin portion provided in contact with the first and second surfaces are hooked to the protruding portion. Besides, in the reactor of the present disclosure, a filled state of the resin on the side of the one short side part can be confirmed through the hole in forming the sealing resin portion since the protruding portion includes the hole. Further, in the reactor of the present disclosure, air bubbles mixed into the resin filled on the side of the one short side part can be removed from the hole in forming the sealing resin portion since the protruding portion includes the hole. That is, the hole provided in the protruding portion functions as a confirmation hole used to confirm the filled state of the resin in forming the sealing resin portion and as a vent for removing air bubbles mixed into the resin. The hole provided in the protruding portion functions as a hooking structure for joining the assembly and the sealing resin portion after the sealing resin portion is formed.

(4) As one form of the above reactor, the short side part includes a mounting seat for supporting the protruding portion, and the protruding portion and the mounting seat are fastened.

In the above form, the assembly can be firmly fixed to the case since the protruding portion of the holding member is fastened to the mounting seat. In the above form, the detachment of the assembly from the case, for example, due to an impact, vibration or the like can be avoided.

Details of Embodiments of Present Disclosure

Specific examples of reactors according to embodiments of the present disclosure are described below with reference to the drawings. The same reference signs in the drawings denote the same components. Components may be shown in a partially exaggerated or simplified manner in the drawings for the convenience of description. A dimension ratio of each part in the drawings may be different from an actual one. Note that the present invention is not limited to these illustrations and is intended to be represented by claims and include all changes in the scope of claims and in the meaning and scope of equivalents.

First Embodiment

Summary

Figure 1B:
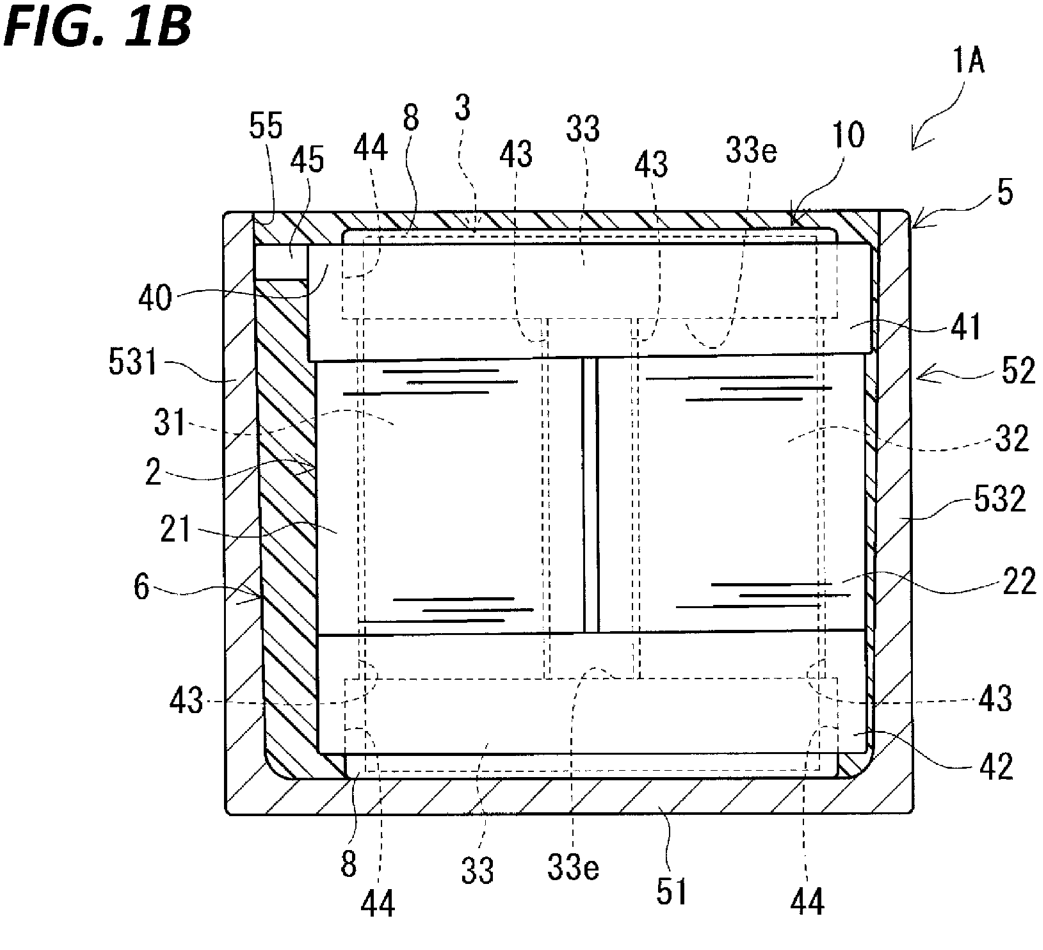
FIG. 1B is a schematic partial side view in section of the reactor according to the first embodiment.

A reactor 1A according to a first embodiment is described with reference to FIGS. 1A to 4B. As shown in FIG. 1B, the reactor 1A includes a coil 2, a magnetic core 3, holding members 41, 42, a case 5 and a sealing resin portion 6. As shown in FIG. 1B, the coil 2 includes a pair of winding portions 21, 22 arranged in parallel. The magnetic core 3 includes inner core portions 31, 32 to be arranged inside the winding portions 21, 22 and outer core portions 33 to be arranged outside the winding portions 21, 22. The holding members 41, 42 specify mutual positions of the coil 2 and the magnetic core 3. The case 5 accommodates an assembly 10 including the coil 2, the magnetic core 3 and the holding members 41, 42. The sealing resin portion 6 is filled into the case 5. One of features of the reactor 1A is that an arrangement mode of the assembly 10 is an upright type to be described later. Another feature of the reactor 1A is that the holding member 41 to be arranged on the side of an opening 55 of the case 5 includes a protruding portion 45. As shown in FIG. 1A, clearances 46 are formed between the protruding portion 45 and at least one long side part 541, 542 in a side wall portion 52 when the case 5 is viewed from above.

Figure 1C:
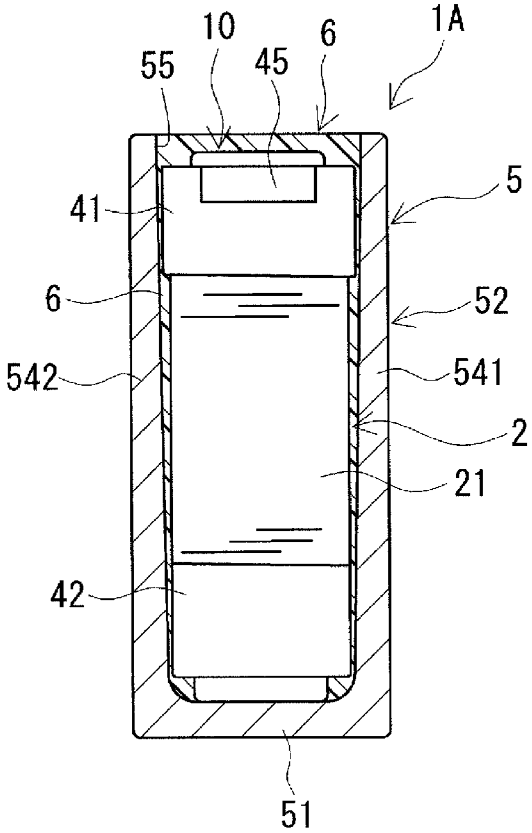
FIG. 1C is a schematic partial front view in section of the reactor according to the first embodiment.
Figure 2:
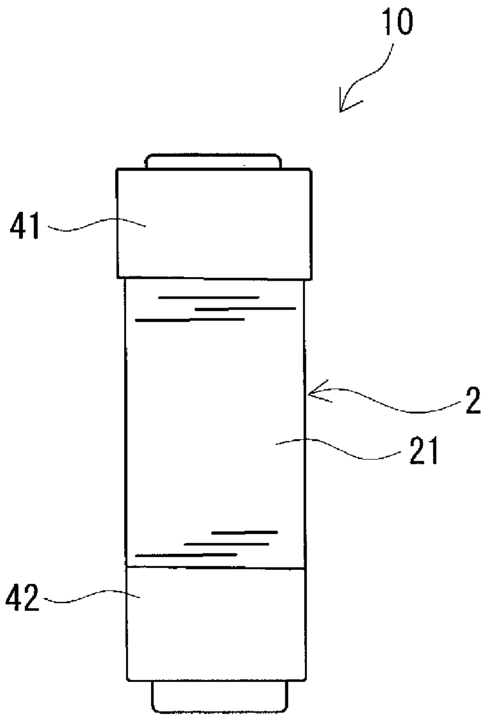
FIG. 2 is a schematic back view of an assembly provided in the reactor according to the first embodiment.

The sealing resin portion 6 is not shown in FIG. 1A. FIGS. 1B and 1C show the case 5 and the sealing resin portion 6 in section to make an internal structure of the reactor 1A easily understandable. FIG. 1B is a partial section along B-B in FIG. 1A. FIG. 1B shows the appearance of the assembly 10 in the case 5 viewed from the side of a side surface and shows cross-sections of the case 5 and the sealing resin portion 6 cut by a plane parallel to the side surface. FIG. 1C is a partial section along C-C in FIG. 1A. FIG. 1C shows the appearance of the assembly 10 in the case 1 viewed from the side of a front surface and shows cross-sections of the case 5 and the sealing resin portion 6 cut by a plane parallel to the front surface. If there are separate figures FIGS. 1A, 1B and 1C, all the separate figures may be collectively referred to as FIG. 1A to 1C. The same applies to figures including other separate figures. In the following description, the side of a bottom plate portion 51 of the case 5 is a lower side and the side of the opening 55 opposite to the bottom plate portion 51 is an upper side. This vertical direction is a height direction. The height direction is a depth direction of the case 5. Further, a direction orthogonal to the height direction and along the long side parts 541, 542 of the side wall portion 52 is a length direction. A direction orthogonal to the height direction and along the short side parts 531, 532 of the side wall portion 52 in the case 5 is a width direction. The vertical direction is a vertical direction of FIGS. 1B and 1C. The length direction is a lateral direction of FIGS. 1A and 1B. The width direction is a vertical direction of FIG. 1A and a lateral direction of FIG. 1C.

The configuration of the reactor 1A is described in detail below.

Coil

As shown in FIG. 1B, the coil 2 includes the pair of winding portions 21, 22. The winding portions 21, 22 are formed by spirally winding a winding wire. The both winding portions 21, 22 are so arranged side by side that the axial directions thereof are parallel. The axial directions of the both winding portions 21, 22 coincide with the height direction. The both winding portions 21, 22 of the coil 2 may be constituted by one continuous winding wire or may be constituted by separate winding wires. If the winding portions 21, 22 are constituted by one continuous winding wire, the winding wire is, for example, bent and folded on the other end side and the other winding portion 22 is formed after one winding portion 21 is formed. If the respective winding portions 21, 22 are constituted by separate winding wires, end parts of the winding wires may be connected on the other end sides of the respective winding portions 21, 22 after the respective winding portions 21, 22 are formed by the respective winding wires. A joining method such as welding, crimping, soldering or brazing can be utilized for this connection. End parts of the winding wires on one end sides of the winding portions 21, 22 are pulled out to outside from the side of the opening 55 of the case 5. Unillustrated terminal fittings are mounted on the tips of the pulled out winding wires. An unillustrated external device such as a power supply is connected to the terminal fittings. Note that only the winding portions 21, 22 are shown and end parts of the winding wires and the like are not shown in FIGS. 1A to 1C and the like.

The winding wire may be a coated wire including a conductor wire and an insulation coating. A constituent material of the conductor wire may be copper or the like. A constituent material of the insulation coating may be a resin such as polyamide-imide. The coated wire may be a coated flat rectangular wire having a rectangular cross-sectional shape, a coated round wire having a circular cross-sectional shape or the like.

The both winding portions 21, 22 of this example are made of the winding wires having the same specifications and have the same shape, size, winding direction and number of turns. Further, the winding portion 21, 22 of this example is an edge-wise coil in the form of a rectangular tube formed by winding a coated flat rectangular wire in an edge-wise manner. Although the winding portion 21, 22 has a rectangular tube shape in this example, there is no particular limitation. The winding portion 21, 22 may have, for example, a hollow cylindrical shape, a hollow elliptical cylindrical shape or a hollow oval cylindrical shape. Further, the specifications of the winding wires forming the both winding portions 21, 22 and the shapes of the both winding portions 21, 22 may be different.

In this example, the winding portion 21, 22 has a rectangular end surface shape when viewed from the axial direction. That is, the winding portion 21, 22 has four flat surfaces and four corner parts. The corner parts of the winding portion 21, 22 are rounded. The outer peripheral surface of the winding portion 21, 22 is substantially constituted by flat surfaces. Thus, flat surfaces are facing each other between the outer peripheral surface of the winding portion 21, 22 and the inner peripheral surface of the side wall portion 52 of the case 5 as shown in FIGS. 1B and 1C. Accordingly, a large facing area of the outer peripheral surface of the winding portion 21, 22 and the inner peripheral surface of the side wall portion 52 in the case 5 is easily secured. Further, an interval between the outer peripheral surface of the winding portion 21, 22 and the inner peripheral surface of the side wall portion 52 in the case 5 tends to become smaller.

As shown in FIG. 1B, the coil 2 is so arranged that the respective axial directions of the both winding portions 21, 22 are orthogonal to the bottom plate portion 51 of the case 5 and a parallel direction of the both winding portions 21, 22 is along the long side parts 541, 542 in the side wall portion 52 of the case 5. That is, the both winding portions 21, 22 are arranged side by side in the length direction of the case 5. In this example, one winding portion 21 is arranged on the side of one short side part 531, i.e. on a left side in FIG. 1B, and the other winding portion 22 is arranged on the side of the other short side part 532, i.e. on a right side in FIG. 1B.

Magnetic Core

Figure 3:
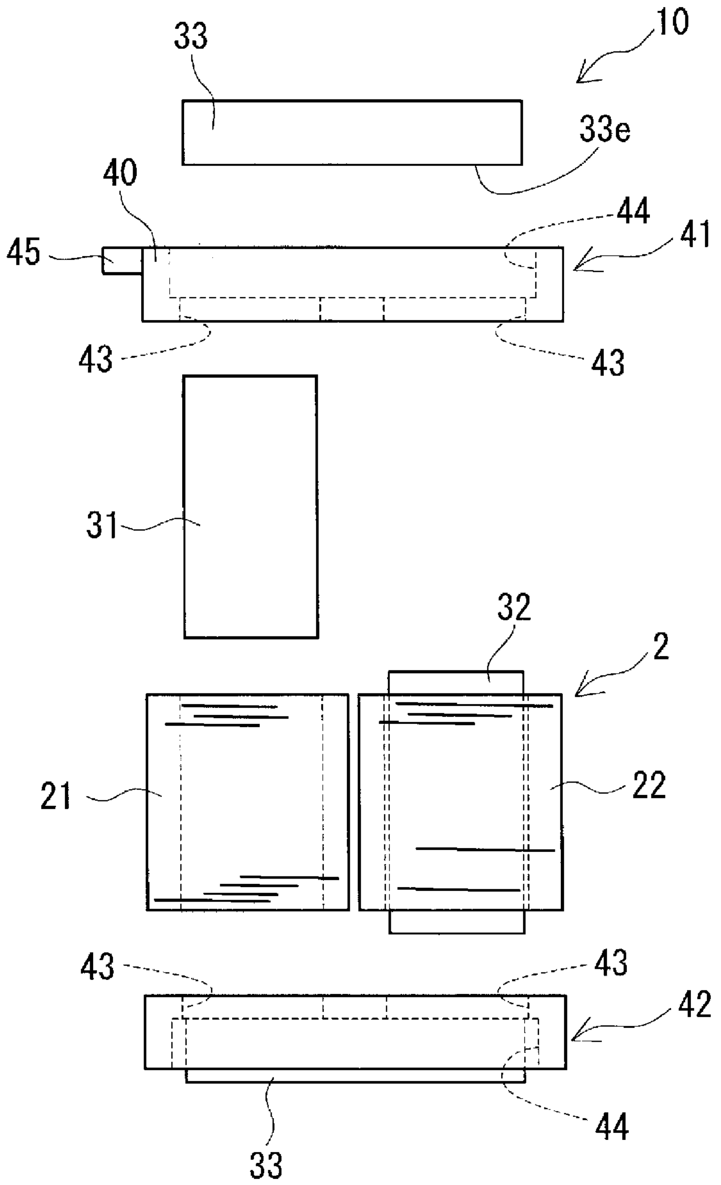
FIG. 3 is a schematic exploded side view of the assembly provided in the reactor according to the first embodiment.

As shown in FIG. 1B, the magnetic core 3 includes inner core portions 31, 32 and a pair of outer core portions 33, 33. The inner core portions 31, 32 mainly constitute parts to be arranged inside the respective winding portions 21, 22. End parts in the axial direction of the inner core portions 31, 32 project from end surfaces of the winding portions 21, 22. The outer core portions 33, 33 are arranged outside the both winding portions 21, 22. The outer core portions 33, 33 are provided to connect end parts of the both inner core portions 31, 32. In this example, as shown in FIG. 3, the outer core portions 33, 33 are respectively arranged to sandwich the both inner core portions 31, 32 from both ends. The magnetic core 3 is formed into an annular shape by connecting the respective end surfaces of the both inner core portions 31, 32 and respective inner end surfaces 33*e* (FIG. 3) of the outer core portions 33, 33. When the coil 2 is excited, a magnetic flux flows in the magnetic core 3 to form a closed magnetic path.

Inner Core Portions

The inner core portions 31, 32 are shaped to substantially correspond to the inner peripheral shapes of the winding portions 21, 22. Clearances are present between the inner peripheral surfaces of the winding portions 21, 22 and the outer peripheral surfaces of the inner core portions 31, 32. A resin for constituting molded resin portions 8 to be described later is filled into these clearances. In this example, the inner core portions 31, 32 have a quadrangular prism shape, more specifically a rectangular parallelepiped shape and have a rectangular end surface shape when viewed from the axial direction. Corner parts of the inner core portions 31, 32 are rounded to extend along the corner parts of the winding portions 21, 22. The both inner core portions 31, 32 have the same shape and size. Both end parts of the inner core portions 31, 32 projecting from the end surfaces of the winding portions 21, 22 are inserted into through holes 43 of the holding members 41, 42 to be described later (see also FIG. 3).

In this example, each of the inner core portions 31, 32 is constituted by one column-like core piece. Each core piece constituting the inner core portion 31, 32 has a length substantially equal to the entire length in the axial direction of the winding portion 21, 22. That is, the inner core portion 31, 32 is not provided with a magnetic gap member. Note that the inner core portion 31, 32 may be constituted by a plurality of core pieces and magnetic gap member(s) interposed between adjacent ones of the core pieces.

Outer Core Portions

The shapes of the outer core portions 33, 33 are not particularly limited as long as the outer core portions 33, 33 are shaped to connect the respective end parts of the both inner core portions 31, 32. In this example, the outer core portions 33, 33 have a rectangular parallelepiped shape having the inner end surface 33*e* facing the respective end surfaces of the both inner core portions 31, 32. The both outer core portions 33, 33 have the same shape and size. Each of the outer core portions 33, 33 is constituted by one column-like core piece.

One outer core portion 33 is arranged outside the winding portions 21, 22 and on the side of the opening 55 of the case 5, i.e. on an upper side in FIG. 1B. The other outer core portion 33 is arranged outside the winding portions 21, 22 and on the side of the bottom plate portion 51 of the case 5, i.e. on a lower side in FIG. 1B. The outer end surface of the outer core portion 33 on the side of the bottom plate portion 51 is arranged to face the inner bottom surface of the bottom plate portion 51.

Constituent Material

The inner core portions 31, 32 and the outer core portions 33, 33 are formed by compacts containing a soft magnetic material. Examples of the soft magnetic material include metals such as iron and iron alloy and non-metals such as ferrite. The iron alloy is, for example, a Fe—Si alloy, a Fe—Ni alloy or the like. Examples of the compact including the soft magnetic material include powder compacts and compacts of composite materials.

A powder compact is obtained by compression-molding a powder made of the soft magnetic material, i.e. a soft magnetic powder. The powder compact has a higher rate of the soft magnetic powder in the core piece than the composite material.

In a compact of a composite material, the soft magnetic powder is dispersed in a resin. The compact of the composite material is obtained by filling a raw material, in which the soft magnetic powder is mixed and dispersed in an unsolidified resin, into a mold and solidifying the resin. Magnetic characteristics, e.g. relative magnetic permeability and saturation flux density of the composite material are easily controlled by adjusting the content of the soft magnetic powder in the resin.

The soft magnetic powder is an aggregate of soft magnetic particles. The magnetic particles may be coated particles having insulation coatings on the surfaces thereof. A constituent material of the insulation coatings may be a phosphate. The resin of the composite material is, for example, a thermosetting resin or thermoplastic resin. Examples of the thermosetting resin include an epoxy resin, a phenol resin, a silicone resin and a urethane resin. Examples of the thermoplastic resin include a polyphenylene sulfide (PPS) resin, a polyamide (PA) resin (e.g. nylon 6, nylon 66, nylon 9T or the like), a liquid crystal polymer (LCP), a polyimide (PI) resin and a fluororesin. The composite material may contain a filler in addition to the resin. By containing the filler, the heat dissipation of the composite material can be improved. A powder made of a nonmagnetic material such as ceramics and carbon nanotubes can be, for example, utilized as the filler. Examples of the ceramics include oxides, nitrides and carbides of metals or non-metals. Examples of the oxides include alumina, silica and magnesium oxide. Examples of the nitrides include silicon nitride, aluminum nitride and boron nitride. Examples of the carbides include silicon carbide.

The constituent material of the inner core portions 31, 32 and that of the outer core portions 33, 33 may be the same or may be different. For example, any of the inner core portions 31, 32 and the outer core portions 33, 33 may be a compact of a composite material and the material and content of the soft magnetic powder in each composite material may be different. In this example, the inner core portions 31, 32 are constituted by compacts of the composite material and the outer core portions 33, 33 are constituted by powder compacts. Further, the magnetic core 3 of this example includes no magnetic gap member.

Holding Members

The reactor 1A of this example includes two holding members 41, 42. As shown in FIGS. 1B and 3, the holding member 41, 42 includes a frame plate, which is a part to be arranged to face the respective end surfaces of the both winding portions 21, 22. Further, the holding member 41, 42 includes a later-described outer wall portion 40, which is a part for covering the outer peripheral surface of the outer core portion 33. One holding member 41 is arranged on the side of the opening 55 of the case 5 to cover the upper outer core portion 33 described above. The other holding member 42 is arranged on the side of the bottom plate portion 51 of the case 5 to cover the lower outer core portion 33 described above. The both holding members 41, 42 ensure electrical insulation between the winding portions 21, 22 of the coil 2 and the inner core portions 31, 32 and the outer core portions 33, 33 of the magnetic core 3. Further, the holding members 41, 42 specify mutual positions of the coil 2 and the magnetic core 3 to maintain a positioned state.

The both holding members 41, 42 have the same basic configuration. The holding member 41, 42 of this example includes the frame plate having the through holes 43, and the outer wall portion 40. The frame plate is interposed between the end surfaces of the winding portions 21, 22 and the inner end part 33e of the outer core portion 33. The outer wall portion 40 covers at least a part of the outer peripheral surface of the outer core portion 33, in this example, over the entire periphery. In this example, the holding member 41, 42 has a rectangular frame shape in a plan view as shown in FIG. 1A. The outer peripheral surface of the outer wall portion 40 is substantially constituted by flat surfaces. The outer peripheral surface of the outer wall portion 40 has four flat surfaces facing the short side parts 531, 532 and the long side parts 541, 542 in the side wall portion 52 of the case 5.

The frame plate mainly ensures electrical insulation between the winding portions 21, 22 and the outer core portion 33. As shown in FIGS. 1B and 3, the frame plate includes a pair of the through holes 43 penetrating through the front and back surfaces of a rectangular plate. The end parts of the inner core portions 31, 32 are inserted into the respective through holes 43. The through holes 43 are shaped to substantially correspond to the outer peripheral shapes of the end parts of the inner core portions 31, 32. In this example, four corners of the through holes 43 are formed along the corner parts of the outer peripheral surfaces of the inner core portions 31, 32. The inner core portions 31, 32 are held in the through holes 43 by the four corners of these through holes 43. Further, with the end parts of the inner core portions 31, 32 inserted in the through holes 43, clearances are partially formed between the outer peripheral surfaces of the inner core portions 31, 32 and the inner peripheral surfaces of the through holes 43. There clearances communicate with the clearances between the inner peripheral surfaces of the winding portions 21, 22 and the outer peripheral surfaces of the inner core portions 31, 32.

The outer wall portion 40 is a rectangular tube surrounding the peripheral edge of the frame plate, and provided to surround the entire periphery of the outer core portion 33. The outer wall portion 40 includes a recess 44 inside. A part of the outer core portion 33 on the side of the inner end surface 33e is fit into the recess 44. In this example, the recess 44 is provided to form a clearance partially between the outer peripheral surface of the outer core portion 33 and the inner peripheral surface of the recess 44 with the outer core portion 33 fit in the recess 44. The resin for constituting the molded resin portion 8 to be described later is filled into this clearance. The respective outer core portions 33, 33 and the respective holding members 41, 42 are integrated by these molded resin portions 8. The holding members 41, 42 of this example are so configured that the clearances between the outer core portions 33, 33 and the recesses 44 and the aforementioned clearances between the inner core portions 31, 32 and the through holes 43 communicate. By the communication of these clearances, the resin for constituting the molded resin portions 8 can be introduced into between the winding portions 21, 22 and the inner core portions 31, 32 when the molded resin portions 8 are formed.

Further, the holding member 41, 42 of this example includes unillustrated inner interposing portions. The inner interposing portions project toward the insides of the winding portions 21, 22 from peripheral edge parts of the through holes 43 and are inserted into between the winding portions 21, 22 and the inner core portions 31, 32. The winding portions 21, 22 and the inner core portions 31, 32 are held at a distance from each other by these inner interposing portions. As a result, electrical insulation between the winding portions 21, 22 and the inner core portions 31, 32 is ensured.

As described above, by inserting the respective end parts of the inner core portions 31, 32 into the respective through holes 43 of the holding members 41, 42, the inner core portions 31, 32 are positioned with respect to the holding members 41, 42. Further, by fitting parts of the outer core portions 33, 33 on the side of the inner end surfaces 33e into the recesses 44 of the holding members 41, 42, the outer core portions 33, 33 are positioned. Furthermore, the winding portions 21, 22 are positioned by the above inner interposing portions. As a result, the winding portions 21, 22 of the coil 2 and the inner core portions 31, 32 and the outer core portions 33, 33 of the magnetic core 3 are held in a positioned state by the holding members 41, 42.

Protruding Portion

Out of the holding members 41, 42, the one holding member 41 located on the side of the opening 55 of the case 5 includes the protruding portion 45 projecting toward one short side part 531 from the outer wall portion 40 as shown in FIGS. 1A and 1B. The protruding portion 45 is provided to project from a part of the outer peripheral surface of the outer wall portion 40 facing the short side part 531. The protruding portion 45 is an integrated body integrally molded with the outer wall portion 40. The protruding portion 45 of this example is a solid body not including a through hole 453 to be described in a second embodiment or the like. As shown in FIG. 1A, the clearance 46 is formed between the protruding portion 45 and at least one of the long side parts 541, 542, more specifically, end parts of the long side parts 541, 542 on the side of the short side part 531. The position and number of the protruding portion(s) 45 are not particularly limited. The protruding portion 45 may be positioned in a center in the width direction of the holding member 41 or may deviate from the center. It is sufficient to provide at least one protruding portion 45 and a plurality of protruding portions 45 may be provided. In this example, one protruding portion 45 is provided in the center in the width direction of the holding member 41.

The shape of the protruding portion 45 is not particularly limited. In this example, as shown in FIG. 1A, the protruding portion 45 has a rectangular shape in a plan view. The shape of the protruding portion 45 is not limited to a rectangular shape, but may be a polygonal shape, a semicircular shape, a semielliptical shape or another shape in the plan view. Examples of the polygonal shape include a triangular shape and a trapezoidal shape. The size of the protruding portion 45 is set to form the clearances 46 of a predetermined size. For example, a projection length of the protruding portion 45 is 5 mm or more and 15 mm or less and, further, 6 mm or more and 12 mm or less. If the projection length of the protruding portion 45 is excessively long, the long side parts 541, 542 become longer and the case 5 is enlarged. Further, a width of the protruding portion 45 is smaller than that of the holding member 41. The width of the protruding portion 45 is, for example, so set that an interval between at least one long side part 541, 542 and the outer peripheral surface of the protruding portion 45 is 5 mm or more and, further, 6 mm or more.

The protruding portion 45 has such a thickness as not to be easily deformed or broken. The thickness here is a dimension in the height direction, i.e. a dimension in the vertical direction of FIG. 1B. The thickness of the protruding portion 45 of this example is about slightly less than half the thickness of the holding member 41. The thickness of the protruding portion 45 may be equal to or larger than the thickness of the entire holding member 41. For example, the protruding portion 45 may be in the form of a rod extending from the holding member 41 toward the other holding member 42. Since a used amount of the resin for forming the sealing resin portion 6 is reduced if the thickness of the protruding portion 45 is increased, manufacturing cost can be reduced by that much.

The protruding portion 45 functions to restrict the position in the length direction of the assembly 10 with respect to the case 5. The protruding portion 45 may be such that the tip thereof in a projecting direction is in contact with the inner surface of the short side part 531. The assembly 10 can be satisfactorily positioned with respect to the case 5 by the contact of the protruding portion 45 with the inner surface of the short side part 531. Particularly, a position shift of the assembly 10 due to a flow of the resin can be suppressed when the sealing resin portion 6 is formed.

Clearances

As shown in FIG. 1A, the clearance 46 is formed between at least one long side part 541, 542 and the protruding portion 45 when the reactor 1A is viewed from above. In this example, the clearances 46 are provided between the both long side parts 541, 542 and the protruding portion 45. That is, the clearances 46 are provided on both sides of the protruding portion 45 on the side of the one short side part 531. In other words, the clearances 46 are provided in regions except the protruding portion 45, out of a region surrounded by the surface of the holding member 41 facing the one short side part 531, the inner surface of the short side part 531 and the respective inner surfaces of the long side parts 541, 542.

Figure 4A:
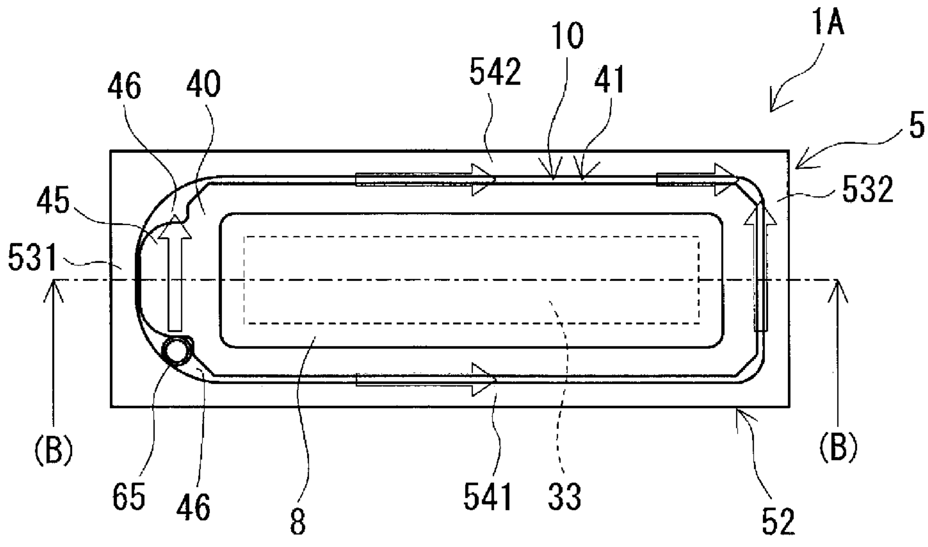
FIG. 4A is a schematic plan view showing a step of forming a sealing resin portion.
Figure 4B:
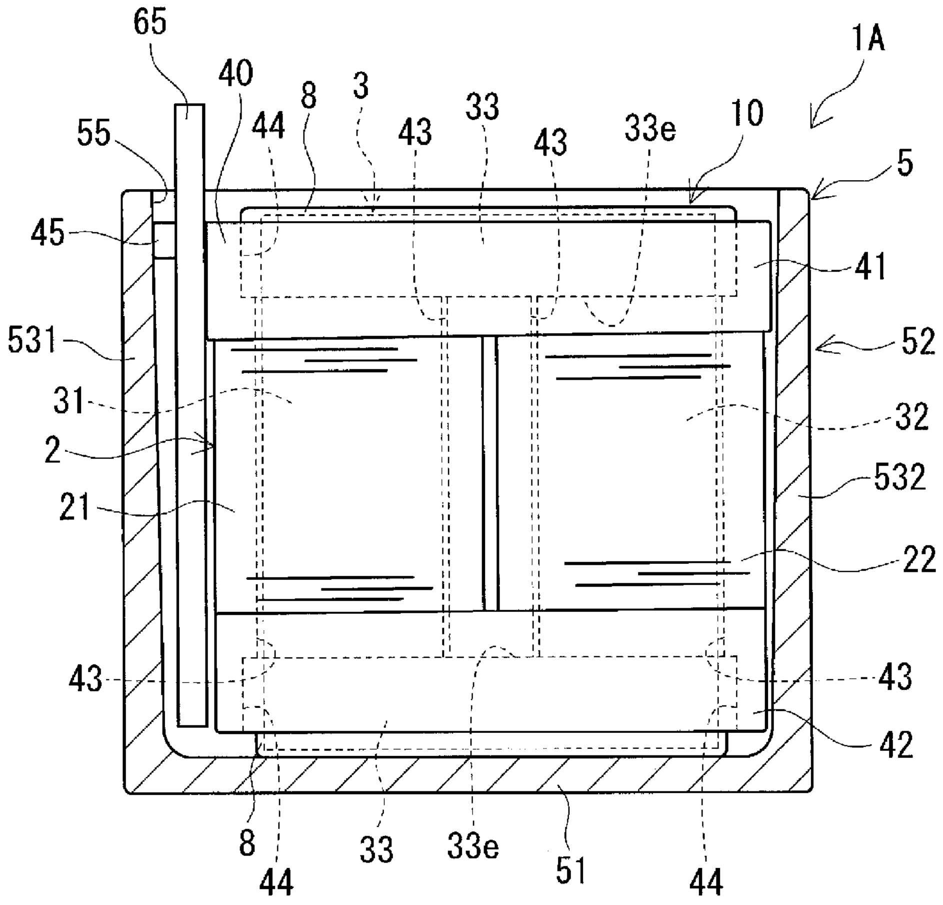
FIG. 4B is a schematic partial side view in section showing the step of forming the sealing resin portion.

In forming the sealing resin portion 6, the nozzle 65 for injecting the resin, which will become the sealing resin portion 6, is inserted into the clearance 46 as shown in FIGS. 4A and 4B. The size of the clearance 46 is not particularly limited as long as the nozzle 65 is insertable thereinto when the reactor 1A is viewed from above. The size of the clearance 46 can be adjusted according to the size of the protruding portion 45. Thus, even if a diameter of the nozzle 65 is large, a clearance into which the nozzle 65 can be inserted can be easily formed. For example, the clearance 46 has, for example, a diameter of 4 mm or more and, further, 5 mm or more in a plan view. The clearance 46 is formed to be continuous from the side of the opening 55 to the side of the bottom plate portion 51 of the case 5.

Constituent Material

Examples of a constituent material of the holding members 41, 42 include electrically insulating materials. Resins are typical examples of the electrically insulating materials. Specific examples of resins include thermosetting resins and thermoplastic resins. Examples of thermosetting resins include an epoxy resin, a phenol resin, a silicone resin, a urethane resin and an unsaturated polyester resin. Examples of thermoplastic resins include a PPS resin, a PA resin, an LCP, a PI resin, a fluororesin, a polytetrafluoroethylene (PTFE) resin, a polybutylene terephthalate (PBT) resin and an acrylonitrile-butadiene-styrene (ABS) resin. The constituent material of the holding members 41, 42 may contain a filler in addition to the resin. By containing the filler, the heat dissipation of the holding members 41, 42 can be improved. A filler similar to the one used in the aforementioned composite material can be utilized as this filler. In this example, the constituent material of the holding members 41, 42 is the PPS resin.

Molded Resin Portions

The assembly 10 of this example includes, as shown in FIG. 1B, the molded resin portions 8. The molded resin portions 8 cover at least parts of the outer peripheral surfaces of the outer core portions 33, 33 and are interposed between the inner peripheral surfaces of the winding portions 21, 22 and the outer peripheral surfaces of the inner core portions 31, 32. The inner core portions 31, 32 and the outer core portions 33 are integrally held by these molded resin portions 8, and the winding portions 21, 22 of the coil 2 and the inner core portions 31, 32 and the outer core portions 33 of the magnetic core 3 are integrated. Thus, the coil 2 and the magnetic core 3 can be handled as an integrated body. Further, the respective outer core portions 33, 33 and the respective holding members 41, 42 are integrated by the molded resin portions 8. That is, in this example, the coil 2, the magnetic core 3 and the holding members 41, 42 are integrated by the molded resin portions 8. Thus, the assembly 10 can be handled as an integrated object. Note that the outer peripheral surfaces of the winding portions 21, 22 are not covered by the molded resin portions 8 and are exposed from the molded resin portions 8.

The molded resin portions 8 only have to be able to integrally hold the inner core portions 31, 32 and the outer core portions 33, 33 and only have to be formed to cover the outer peripheral surfaces along a circumferential direction of at least end parts of the inner core portions 31, 32. That is, the molded resin portions 8 may not extend up to axially central parts of the inner core portions 31, 32. In view of the function of the molded resin portions 8 to integrally hold the inner core portions 31, 32 and the outer core portions 33, 33, it is sufficient for formation ranges of the molded resin portions 8 to extend up to the vicinities of the end parts of the inner core portions 31, 32. Of course, the molded resin portions 8 may extend up to the axially central parts of the inner core portions 31, 32. In this case, the molded resin portions 8 cover the outer peripheral surfaces of the inner core portions 31, 32 over the entire length and are formed from one outer core portion 33 to the other outer core portion 33.

Constituent Material

The resin for constituting the aforementioned holding members 41, 42 can be used as the resin for constituting the molded resin portions 8. A constituent material of the molded resin portions 8 may contain the aforementioned filler in addition to the resin. In this example, the molded resin portions 8 are made of a PPS resin.

Case

By accommodating the assembly 10 as shown in FIGS. 1A to 1C, the case 5 can mechanically protect the assembly 10 and protect the assembly 10 from an external environment. Protection from the external environment aims to improve corrosion resistance and the like. The case 5 of this example is made of metal. Metals are higher in thermal conductivity than resins. Thus, the case 5 made of metal easily dissipates the heat of the assembly 10 to outside via the case 5. Therefore, the case 5 made of metal contributes to an improvement in the heat dissipation of the assembly 10.

As shown in FIGS. 1A to 1C, the case 5 includes the bottom plate portion 51, the side wall portion 52 and the opening 55. The bottom plate portion 51 is a flat plate member, on which the assembly 10 is placed. The side wall portion 52 is a rectangular tube body for surrounding the assembly 10. The case 5 is a bottomed tubular container in which an accommodation space for the assembly 10 is formed by the bottom plate portion 51 and the side wall portion 52 and the opening 55 is formed on the side facing the bottom plate portion 51. In this example, the bottom plate portion 51 and the side wall portion 52 are integrally formed. The side wall portion 52 has a height equal to or more than that of the assembly 10.

The bottom plate portion 51 of this example is in the form of a rectangular plate. In the bottom plate portion 51, the inner bottom surface on which the assembly 10 is placed is substantially constituted by a flat surface. The side wall portion 52 of this example is in the form of a rectangular tube. The side wall portion 52 includes the pair of long side parts 541, 542 facing each other and the pair of short side parts 531, 532 facing each other. In the case of this example, out of the inner peripheral surface of the side wall portion 52, the surfaces of the long side parts 541, 542 and the short side parts 531, 532 facing the winding portions 21, 22 are substantially constituted by flat surfaces. Further, a part of the inner peripheral surface of the short side part 531 facing the protruding portion 45 is also substantially constituted by a flat surface. Parts connected from the short side part 531 to the both long side parts 541, 542 are constituted by curved surfaces.

As shown in FIG. 1A, the side wall portion 52 of this example has a substantially rectangular tube shape in a plan view. The substantially rectangular tube shape means that the inner peripheral surface of the side wall portion 52 has a substantially rectangular shape when the case 5 is viewed from above. The rectangular shape here may not be rectangular in a geometrically strict sense and may include a range of rectangular shapes regarded to be substantially rectangular, including shapes having rounded corner parts and chamfered corner parts. For example, a shape having corner parts formed by curved surfaces having a relatively large radius of curvature like the side wall portion 52 of this example is also included.

The inner peripheral surface of the side wall portion 52 may be inclined to widen from the side of the bottom plate portion 51 toward the side of the opening 55. More specifically, at least either the inner surfaces of the long side parts 541, 542 or the inner surfaces of the short side parts 531, 532 of the side wall portion 52 are inclined to be more spaced apart from each other from the side of the bottom plate portion 51 toward the side of the opening 55. That is, at least one of the inner surfaces of the long side parts 541, 542 and the inner surfaces of the short side parts 531, 532 of the side wall portion 52 may be inclined outwardly of the case 5 with respect to a perpendicular direction to the inner bottom surface of the bottom plate portion 51. Note that the above perpendicular direction is equivalent to the height direction of the case 5.

If the respective inner surfaces of the long side parts 541, 542 and the short side parts 531, 532 are inclined to be more spaced apart from each other from the side of the bottom plate portion 51 toward the side of the opening 55, the assembly 10 is easily accommodated into the case 5 in the manufacturing process of the reactor 1. Further, in the case of manufacturing the case 5 made of metal by die casting, the case 5 is easily removed from a mold if at least one of the respective inner surfaces of the long side parts 541, 542 and the short side parts 531, 532 is inclined. In this example, as shown in FIGS. 1B and 1C, all the inner surfaces of the long side parts 541, 542 and the short side parts 531, 532 are inclined to widen the inner peripheral surface of the side wall portion 52 from the side of the bottom plate portion 51 toward the side of the opening 55.

Angles of inclination between the respective inner surfaces of the long side parts 541, 542 and the short side parts 531, 532 and a perpendicular to the inner bottom surface of the bottom plate portion 51 can be appropriately selected. The angles of inclination are, for example, 0.5° or more and 5° or less and, further, 1° or more and 2° or less. If the angles of inclination are excessively large, the interval between the outer peripheral surface of the assembly 10 and the inner peripheral surface of the side wall portion 52 becomes larger on the side of the opening 55. However, if the interval is excessively large, the heat of the assembly 10 on the side of the opening 55 is less likely to be transferred to the case 5. Thus, excessively large angles of inclination are not preferable also in terms of heat dissipation. Therefore, an upper limit of the angles of inclination is set to be 5° or less and, further, 2° or less.

A length of the case 5 is, for example, 80 mm or more and 120 mm or less and, further, 90 mm or more and 115 mm or less. A width of the case 5 is, for example, 30 mm or more and 80 mm or less and, further, 35 mm or more and 70 mm or less. A height of the case 5 is, for example, 70 mm or more and 140 mm or less and, further, 80 mm or more and 130 mm or less. The length of the case 5 is a length in the lateral direction of FIGS. 1A and 1B. The width of the case 5 is a length in the vertical direction of FIG. 1A. The height of the case 5 is a length in the vertical direction of FIG. 1B. A volume of the case 5 is, for example, 120 $cm^2$ or more and 1200 $cm^3$ or less and, further, 200 $cm^2$ or more and 900 $cm^3$ or less. The case 5 of this example has the length larger than the width and has the height larger than the width. Thus, an area obtained by the length×width of the case 5 is smaller than an area obtained by the length×height of the case 5.

Constituent Material

The case 5 is made of nonmagnetic metal. Examples of nonmagnetic metal include aluminum, alloys thereof, magnesium and alloys thereof, copper and alloys thereof, silver and alloys thereof and austenite-based stainless steels. These metals are relatively high in thermal conductivity. Thus, the case 5 can be used as a heat dissipation path, and the heat of the assembly 10 is efficiently dissipated to outside via the case 5. Therefore, the heat dissipation of the assembly 10 is improved. Besides metals, resins and the like can be used as the material for constituting the case 5.

The case 5 made of metal can be, for example, manufactured by die casting. The case 5 of this example is constituted by a die cast product made of aluminum.

Arrangement Mode of Assembly

An arrangement mode of the assembly 10 with respect to the case 5 is the upright type. In this case, as shown in FIG. 1B, the assembly 10 is so accommodated into the case 5 that the respective axial directions of the both winding portions 21, 22 are orthogonal to the inner bottom surface of the bottom plate portion 51. Further, the assembly 10 of this example is so accommodated into the case 5 that the parallel direction of the both winding portions 21, 22 is along the long side parts 541, 542. In the case of this example, since the holding member 41 includes the protruding portion 45 on the side of the one short side part 531, the assembly 10 is arranged closer to the other short side part 532 with respect to the case 5. If the arrangement mode of the assembly 10 is the upright type, an installation area of the assembly 10 with respect to the bottom plate portion 51 can be reduced as compared to the aforementioned horizontally placed type. In the horizontally placed type, an assembly is so accommodated in a case that a parallel direction and axial directions of both winding portions are parallel to a bottom plate portion. Generally, the length of the assembly 10 along a direction orthogonal to both the parallel direction of the both winding portions 21, 22 and the axial directions of the both winding portions 21, 22 is shorter than the length of the assembly 10 along the axial directions of the both winding portion 21, 22. That is, in the case of the upright type, the installation area of the assembly 10 is smaller as compared to the horizontally placed type. Therefore, if the arrangement mode of the assembly 10 is the upright type, an area of the bottom plate portion 51 can be reduced and the installation area of the reactor 1A can be reduced.

Further, if the outer peripheral surfaces of the winding portions 21, 22 are substantially constituted by flat surfaces as in this example, a large facing area of the winding portions 21, 22 and the side wall portion 52 is ensured. Further, the intervals between the outer peripheral surfaces of the winding portions 21, 22 and the inner peripheral surface of the side wall portion 52 tend to become smaller. In the case of this example, the intervals between the outer peripheral surfaces of the winding portions 21, 22 and the inner surfaces of the long side parts 541, 542 and the interval between the outer peripheral surface of the winding portion 22 and the inner surface of the short side part 532 tend to become smaller. Thus, in the reactor 1A, the case 5 can be efficiently utilized as a heat dissipation path. Therefore, the reactor 1A easily dissipates the heat of the coil 2 to the case 5 and is excellent in the heat dissipation of the assembly 10.

The interval between the outer peripheral surface of the assembly 10 and the inner peripheral surface of the side wall portion 52 is, for example, 0.5 mm or more and 1.5 mm or less and, further, 0.5 mm or more and 1 mm or less. This interval is an interval between the outer peripheral surface of the outer wall portion 40 of the other holding member 42 located on the side of the opening 55 and the long side parts 541, 542 and the short side part 532 of the side wall portion 52. The reason for this is that, out of the assembly 10, a closest member to the side wall portion 52, except the protruding portion 45, is the holding member 42. If the respective inner surfaces of the long side parts 541, 542 and the short side parts 531, 532 of the side wall portion 52 are inclined as described later, a minimum value may be adopted as the above interval. If this interval is 0.5 mm or more, the resin, which will become the sealing resin portion 6, easily flows between the assembly 10 and the side wall portion 52. On the other hand, if the above interval is 1.5 mm or less and, further, 1 mm or less, the case 5 is easily reduced in size. Further, if the above interval is 1.5 mm or less and, further, 1 mm or less, the intervals between the outer peripheral surfaces of the winding portions 21, 22 and the inner peripheral surface of the side wall portion 52 become smaller. Thus, the heat dissipation of the assembly 10 can be improved.

Sealing Resin Portion

The sealing resin portion 6 is filled into the case 5 and seals at least a part of the assembly 10. The assembly 10 can be mechanically protected and protected from an external environment by the sealing resin portion 6. Protection from the external environment aims to improve corrosion resistance and the like.

In this example, the sealing resin portion 6 is filled up to the opening end of the case 5 and the entire assembly 10 is embedded in the sealing resin portion 6. Only a part of the assembly 10 may be sealed by the sealing resin portion 6. For example, a part of the assembly 10 up to the height of the upper end surfaces of the winding portions 21, 22 may be sealed by the sealing resin portion 6. Further, the sealing resin portion 6 is interposed between the winding portions 21, 22 of the coil 2 and the side wall portion 52 of the case 5. In this way, the heat of the coil 2 can be transferred to the case 5 via the sealing resin portion 6 and the heat dissipation of the assembly 10 is improved.

Constituent Material

Examples of the resin of the sealing resin portion 6 include thermosetting resins and thermoplastic resins. Examples of thermosetting resins include an epoxy resin, a urethane resin, a silicone resin and an unsaturated polyester resin. Examples of thermoplastic resins include a PPS resin. The sealing resin portion 6 of this example is made of silicone resin, more specifically, silicone gel. The higher the thermal conductivity of the sealing resin portion 6, the more preferable. The reason for this is that the heat of the coil 2 is easily transferred to the case 5. Thus, the material for constituting the sealing resin portion 6 may contain, for example, a filler as described above in addition to the above resin. Components of the above material may be adjusted to enhance the thermal conductivity of the sealing resin portion 6. The thermal conductivity of the sealing resin portion 6 is, for example, preferably 1 W/m·K or more and, further, 1.5 W/m·K or more.

Besides, an unillustrated adhesive layer may be provided between the assembly 10 and the bottom plate portion 51. The adhesive layer can firmly fix the assembly 10 to the case 5. The adhesive layer may be made of electrically insulating resin. Examples of the electrically insulating resin for constituting the adhesive layer include thermosetting resins and thermoplastic resins. Examples of thermosetting resins include an epoxy resin, a silicone resin and an unsaturated polyester resin. Examples of thermoplastic resins include a PPS resin and an LCP. The constituent material of the adhesive layer may contain the aforementioned filler in addition to the above resin. The adhesive layer may be formed, utilizing a commercially available adhesive sheet or commercially available adhesive.

Manufacturing Method

Mainly with reference to FIGS. 4A and 4B, an example of a manufacturing method of the reactor 1A described above is described. The reactor 1A can be manufactured by a manufacturing method including the following first to third steps.

In the first step, the assembly 10 and the case 5 are prepared.

In the second step, the assembly 10 is accommodated into the case 5.

In the third step, the sealing resin portion 6 is formed in the case 5.

FIG. 4A shows an arrangement position of the nozzle 65 in a step of forming the sealing resin portion 6. FIG. 4B is a partial section along B-B in FIG. 4A. FIG. 4B shows the appearance of the assembly 10 in the case 5 viewed from the side of a side surface as in FIG. 1B and shows a cross-section of the case 5 cut by a plane parallel to the side surface.

First Step

In the first step, the assembly 10 and the case 5 are prepared. As shown in FIG. 3, the assembly 10 is fabricated by assembling the coil 2, the magnetic core 3 and the holding members 41, 42. Further, in this example, the molded resin portions 8 are formed, and the coil 2, the magnetic core 2 and the holding members 41, 42 are integrated by the molded resin portions 8 as shown in FIG. 4B. Specifically, the molded resin portions 8 are formed to cover the outer peripheral surfaces of the outer core portions 33 with the coil 2 and the magnetic core 3 held at predetermined positions by the holding members 41, 42. At this time, part of the resin for constituting the molded resin portions 8 is filled between the winding portions 21, 22 and the inner core portions 31, 32 through the clearances between the outer core portions 33 and the recesses 44 and the clearances between the inner core portions 31, 32 and the through holes 43. Thus, the molded resin portions 8 are formed to be interposed between the winding portions 21, 22 and the inner core portions 31, 32.

The prepared case 5 is, for example, made of nonmagnetic metal. In this example, the case 5 is a die-cast product made of aluminum.

Second Step

In the second step, the assembly 10 is accommodated into the case 5 through the opening 55 of the case 5. The assembly 10 is so accommodated into the case 5 that the arrangement mode of the assembly 10 is the upright type. In this example, as shown in FIG. 4B, the assembly 10 is so accommodated into the case 5 that the respective axial directions of the both winding portions 21, 22 are orthogonal to the bottom plate portion 51 and the parallel direction of the both winding portions 21, 22 is along the long side parts 541, 542 (FIG. 4A). In the case of this example, the assembly 10 can be positioned with respect to the case 5 by the protruding portion 45 of the holding member 41.

Third Step

In the third step, the resin is filled into the case 5 to form the sealing resin portion 6 shown in FIG. 1B. Specifically, as shown in FIGS. 4A and 4B, the resin, which will become the sealing resin portion 6, is filled with the assembly 10 accommodated into the case 5. In this example, the nozzle 65 for injecting the resin is used. In this example, the resin, which will become the sealing resin portion 6, is a silicone resin, more specifically, a silicone gel.

As shown in FIG. 4A, the resin is filled by inserting the nozzle 65 into the clearance 46 formed between the long side part 541, 542 of the side wall portion 52 and the protruding portion 45 of the holding member 41. Then, as shown in FIG. 4B, the resin in a fluid state is injected from the side of the bottom plate portion 51 through the nozzle 65. For example, a thermosetting resin may be injected by being mixed and stirred. Here, a case where the nozzle 65 is inserted into one clearance 46 on the side of the long side part 541 is illustrated as shown in FIG. 4A. The diameter of the nozzle 65 is, for example, 3.5 mm or more and 5 mm or less. The tip of the nozzle 65 preferably reaches the vicinity of the bottom plate portion 51. The tip of the nozzle 65 may not reach the vicinity of the bottom plate portion 51.

If the resin is caused to flow from the side of the opening 55 of the case 5, air bubbles tend to be included in the resin and tend to remain in the sealing resin portion 6. Particularly, air bubbles tend to remain in the sealing resin portion 6 on the side of the bottom plate portion 51. If the nozzle 65 is inserted into the clearance 46 and the resin is injected from the side of the bottom plate portion 51 to the side of the opening 55, air bubbles are hardly included in the resin and hardly remain in the sealing resin portion 6. Particularly, it can be avoided that air bubbles remain in the sealing resin portion 6 on the side of the bottom plate portion 51. Thus, the sealing resin portion 6 can be satisfactorily filled into the case 5.

In the case of this example, a state where the assembly 10 is positioned with respect to the case 5 can be maintained by the contact of the protruding portion 45 of the holding member 41 with the short side part 531 of the side wall portion 52. Thus, a position shift of the assembly 10 can be effectively suppressed when the resin, which will become the sealing resin portion 6, is filled.

If the nozzle 65 is inserted into the clearance 46 provided on the side of the one short side part 531 as shown in FIG. 4A, the resin flows from the side of the short side part 531 toward the side of the other short side part 532. As shown by white arrows in FIG. 4A, the resin injected from the nozzle 65 flows between the assembly 10 and the long side parts 541, 542 from the side of the one short side part 531 and merges on the side of the other short side part 532. Thus, a merging point of the resin is created at a location distant from a location where the resin was injected. In this case, air bubbles mixed into the resin float up while the resin is flowing from the side of the one short side part 531 toward the side of the other short side part 532, and the air bubbles in the resin are easily removed. Thus, the remaining of the air bubbles in the sealing resin portion 6 can be reduced by injecting the resin from the side of the one short side part 531. Further, if the resin is injected from the side of the one short side part 531, the merging point of the resin is one location on the side of the other short side part 532. Since the entrainment of air bubbles easily occurs at the merging point of the resin, less merging points are preferable. Since the resin merges at one location by injecting the resin from the one short side part 531, the remaining of air bubbles is easily reduced.

Although FIG. 4A illustrates the case where the nozzle 65 is inserted into one clearance 46 on the side of the long side part 541 and the resin is injected, there is no limitation to this. A nozzle may be also inserted into the clearance 46 on the side of the long side part 542 and the resin may be injected from two nozzles.

The resin is preferably filled by placing the case 5 accommodating the assembly 10 in a vacuum tank and injecting the resin in a vacuum state. The generation of air bubbles in the sealing resin portion 6 can be suppressed by injecting the resin in the vacuum state.

By solidifying the resin after the resin is filled into the case 5, the sealing resin portion 6 shown in FIG. 1B is formed. The resin may be solidified under appropriate conditions according to the used resin.

Main Effects

The reactor 1A of the first embodiment achieves the following effects.

Since the arrangement mode of the assembly 10 is the upright type, the installation area of the assembly 10 with respect to the bottom plate portion 51 of the case 5 is reduced. Thus, the reactor 1A can be reduced in size. Further, if the arrangement mode of the assembly 10 is the upright type, the facing area of the winding portions 21, 22 and the side wall portion 52 tend to increase and the intervals between the winding portions 21, 22 and the side wall portion 52 tend to become smaller. Thus, reactor 1A easily dissipates the heat of the coil 2 to the case 5 and can improve the heat dissipation of the assembly 10.

In the reactor 1A, one holding member 41 includes the protruding portion 45 and the clearances 46 are formed between the long side parts 541, 542 and the protruding portion 45. Thus, in forming the sealing resin portion 6, the resin, which will become the sealing resin portion 6, can be filled by inserting the nozzle 65 into the clearance 46. The size of the clearance 46 can be adjusted according to the size of the protruding portion 45. Thus, even if the diameter of the nozzle 65 is large, the clearance 46 corresponding to the diameter of the nozzle 65 can be easily formed. If the diameter of the nozzle 65 is large, the resin filling operation can be efficiently performed. Therefore, the reactor 1A is excellent in productivity.

Further, since the holding member 41 includes the protruding portion 45, the assembly 10 can be positioned with respect to the case 5. Thus, when the resin, which will become the sealing resin portion 6, is filled into the case 5, a position shift of the assembly 10 can be suppressed by the contact of the tip of the protruding portion 45 with one short side part 531. This point contributes to an improvement of productivity.

Besides, the following effects can be expected for the reactor 1A of the first embodiment.

In forming the sealing resin portion 6, the resin can be injected by inserting the nozzle 65 into the clearance 46. Since it is not necessary to provide a resin introduction path in the side wall portion 52 of the case 5, the case 5 needs not be specially processed. Thus, the processing labor and manufacturing cost of the case 5 can be reduced.

The protruding portion 45 is provided only on the side facing the one short side part 531, out of the outer peripheral surface of the holding member 41, and the clearances 46 are formed only on the side of the one short side part 531. Thus, the case 5 can be reduced in size as compared to the case where the protruding portion 45 is also provided on the side of the other short side part 532 and the clearances 46 are formed on the sides of the both short side parts 531, 532.

In the case of injecting the resin by inserting the nozzle 65 into the clearance 46, the resin is injected from the side of the one short side part 531 and flows toward the side of the other short side part 532. In this case, the merging point of the resin is created at the location distant from the location where the resin was injected. Thus, air bubbles in the resin are easily removed. By injecting the resin from the side of the one short side part 531, the remaining of air bubbles in the sealing resin portion 6 can be reduced. Further, if the resin is injected from the side of the one short side part 531, the merging point of the resin is one location on the side of the other short side part 532. Since the merging point of the resin is one location, the remaining of air bubbles is easily reduced.

By injecting the resin from the side of the bottom plate portion 51 by inserting the nozzle 65 into the clearance 46, air bubbles are hardly mixed into the resin and the remaining of air bubbles in the sealing resin portion 6 can be avoided. Thus, the sealing resin portion 6 is satisfactorily filled into the case 5.

Use Application

The reactor 1A can be used as a component of a circuit for performing a voltage stepping-up operation and a voltage stepping-down operation. The reactor 1A can be used, for example, as a constituent component of various converters and power conversion devices. Examples of converters include in-vehicle converters to be installed in vehicles, typically DC-DC converters and converters of air conditioners. Example of the vehicles include hybrid vehicles, plug-in hybrid electric vehicles, electric vehicles and fuel cell vehicles.

Second Embodiment

A reactor 1B according to a second embodiment is described with reference to FIGS. 5A and 5B. The reactor 1B has a basic configuration similar to that of the reactor 1A of the first embodiment. The reactor 1B of the second embodiment differs from the reactor 1A of the first embodiment in that a protruding portion 45 includes a through hole 453 and a part of a sealing resin portion 6 is filled into this through hole 453. The following description is centered on points of difference from the first embodiment and similar matters are not described.

Figure 5A:
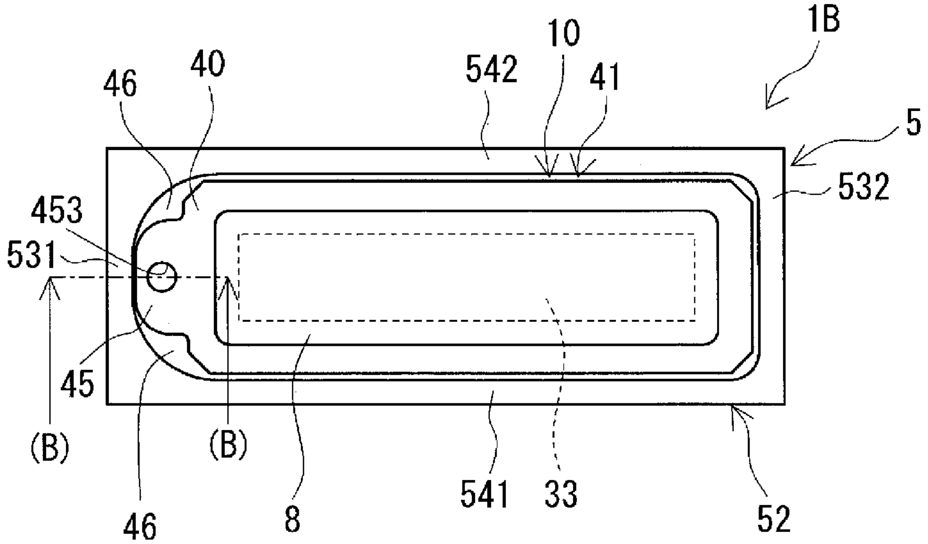
FIG. 5A is a schematic plan view of a reactor according to the second embodiment.
Figure 5B:
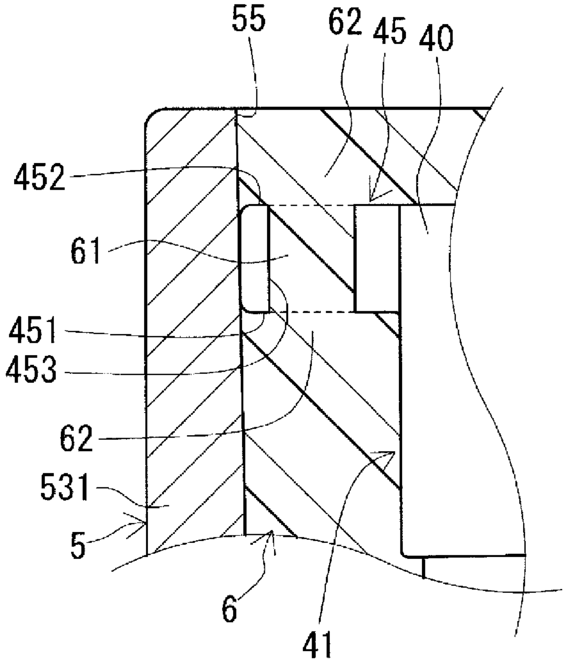
FIG. 5B is a schematic partial side view in section of the reactor according to the second embodiment.

FIG. 5B is a partial section along B-B in FIG. 5A showing the vicinity of the protruding portion 45. FIG. 5B shows the appearance of an assembly 10 in a case 5 viewed from the side of a side surface as in FIG. 1B and shows cross-sections of the case 5 and the sealing resin portion 6 cut by a plane parallel to the side surface.

Protruding Portion

As shown in FIG. 5B, the protruding portion 45 has a first surface 451 located on the side of a bottom plate portion 51 (FIG. 1B) of the case 5 and a second surface 452 located on the side of an opening 55 of the case 5. The protruding portion 45 includes the through hole 453 penetrating through the first and second surfaces 451, 452 as shown in FIGS. 5A and 5B. In this example, one through hole 453 is provided in a widthwise center of the protruding portion 45. The protruding portion 45 may be provided with a plurality of the through holes 453.

An axial direction in the through hole 453 is parallel to axial directions of through holes 43 provided in a frame plate of a holding member 41. The through hole 453 of this example is formed by a circular hole having a uniform diameter. A cross-sectional shape of the through hole 453 is not limited to a circular shape, and may be a polygonal shape or the like. The through hole 453 may also be formed into a tapered shape having a diameter gradually reduced from the side of the first surface 451 toward the second surface 452. A part of the sealing resin portion 6 is filled into the through hole 453. Thus, by forming the through hole 453 into a tapered shape, a large contact area of the protruding portion 45 and the sealing resin portion 6 is easily secured. Further, by forming the through hole 453 into a tapered shape, the sealing resin portion 6 is easily hooked in a region continuous from a tapered surface to the first surface 451.

Sealing Resin Portion

The sealing resin portion 61 includes a first resin portion 61 to be filled into the through hole 453 provided in the protruding portion 45 and a second resin portion 62 provided in contact with the first and second surfaces 451, 452. The first and second resin portions 61, 62 constitute a continuously provided integrated body.

In the reactor 1B of the second embodiment, the protruding portion 45 includes the through hole 453 and a part of the sealing resin portion 6 is filled into the through hole 453, whereby the protruding portion 45 and the sealing resin portion 6 can be firmly joined and, consequently, the assembly 10 and the sealing resin portion 6 can be firmly joined. This is because the first resin portion 61 filled in the through hole 453 and the second resin portion 62 provided in contact with the first and second surfaces 451, 452 are hooked to the protruding portion 45.

Besides, in the reactor 1B of the second embodiment, a filled state of the resin on the side of one short side part 531 can be confirmed through the through hole 453 in forming the sealing resin portion 6 since the protruding portion 45 includes the through hole 453. Further, in the reactor 1B of the second embodiment, air bubbles mixed into the resin filled on the side of the one short side part 531 can be removed from the through hole 453 in forming the sealing resin portion 6 since the protruding portion 45 includes the through hole 453.

Third Embodiment

A reactor 1C according to a third embodiment is described with reference to FIGS. 6A, 6B and 7. The reactor 1C of the third embodiment differs from the reactor 1A of the first embodiment in that a short side part 531 includes a mounting seat 56 for supporting a protruding portion 45 of a holding member 41 and the protruding portion 45 and the mounting seat 56 are fastened. The following description is centered on points of difference from the first embodiment and similar matters are not described.

Figure 6A:
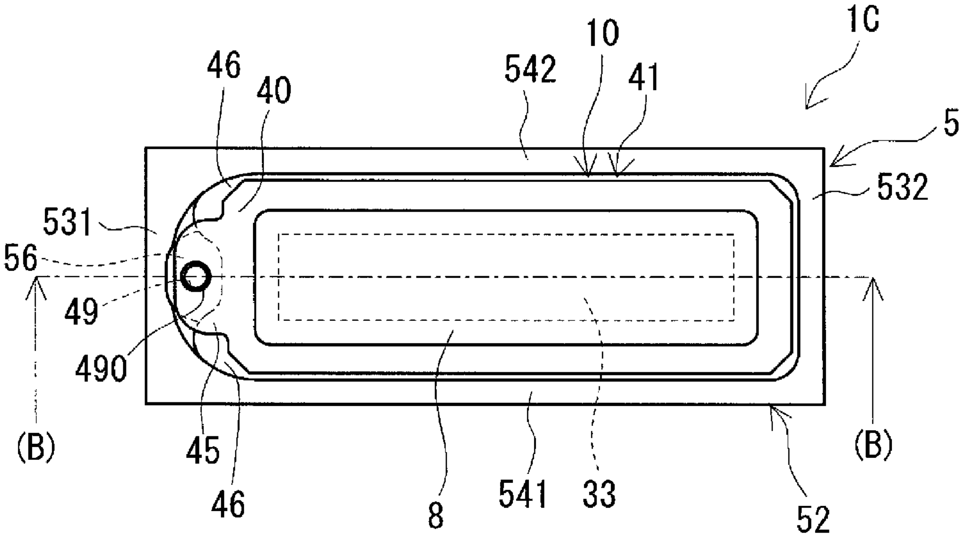
FIG. 6A is a schematic plan view of a reactor according to a third embodiment.
Figure 6B:
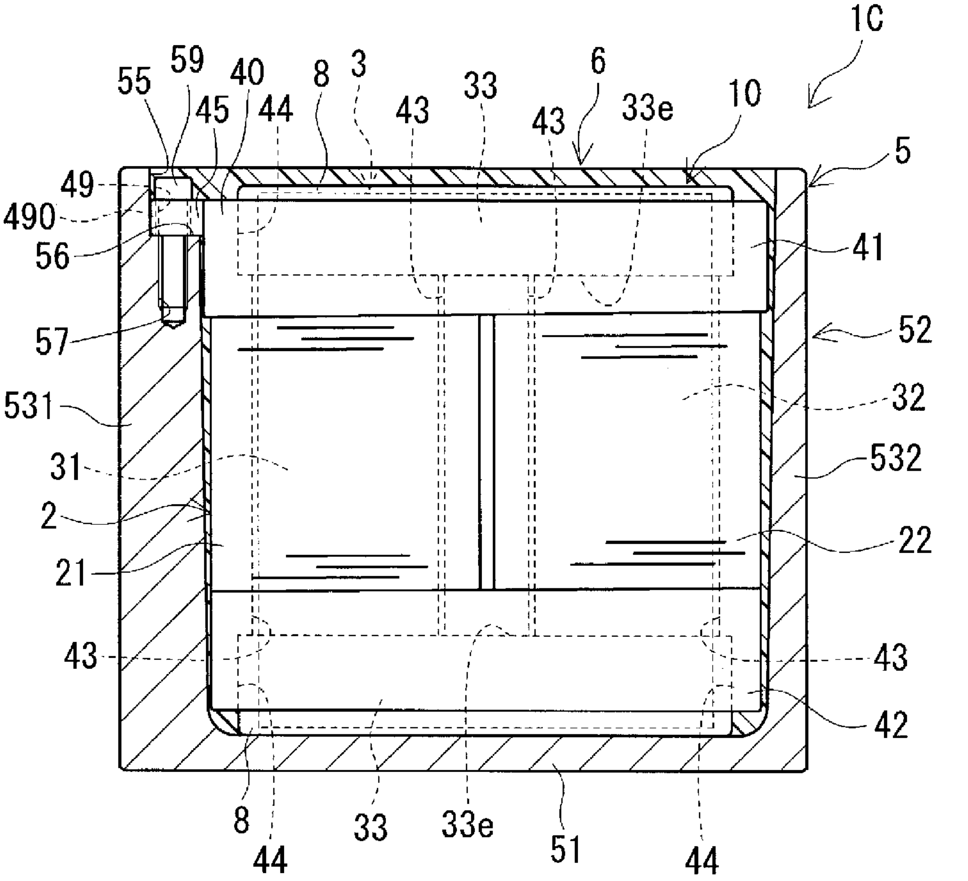
FIG. 6B is a schematic partial side view in section of the reactor according to the third embodiment.
Figure 7:
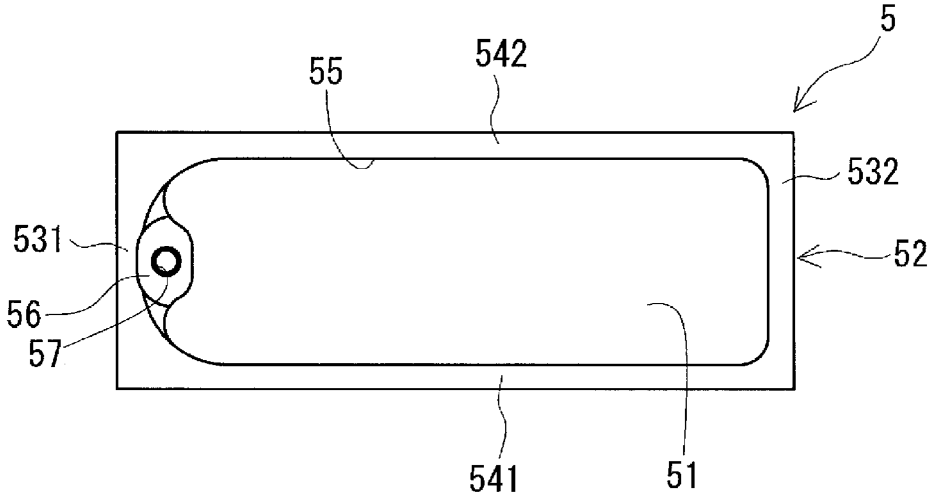
FIG. 7 is a schematic plan view of a case provided in the reactor according to the third embodiment.

FIG. 6B is a partial section along B-B in FIG. 6A. FIG. 6B shows the appearance of an assembly 10 in a case 5 viewed from the side of a side surface as in FIG. 1B and shows cross-sections of the case 5 and a sealing resin portion 6 cut by a plane parallel to the side surface.

Mounting Seat

As shown in FIG. 6B, the mounting seat 56 projects into the case 5 from the short side part 531 and supports a part of the protruding portion 45 on the side of a bottom plate portion 51. As shown in FIG. 6A, the mounting seat 56 is provided to overlap the protruding portion 45 when the reactor 1C is viewed from above. In this example, the mounting seat 56 is formed to extend along the inner surface of the short side part 531 from the bottom plate portion 51. The mounting seat 56 includes a screw hole 57 in an upper surface on the side of an opening 55 of the case 5.

Protruding Portion

As shown in FIGS. 6A and 6B, the protruding portion 45 includes a through hole 49 penetrating through a first surface located on the side of the bottom plate portion 51 of the case 5 and a second surface located on the side of the opening 55 of the case 5. The through hole 49 of this example is formed by embedding a collar 490 made of metal in the protruding portion 45. The through hole 49 is provided at a position overlapping the screw hole 57 of the mounting seat 56 when the reactor 1C is viewed from above.

The protruding portion 45 may include another unillustrated through hole in addition to the through hole 49 overlapping the screw hole 57 of the mounting seat 5. A part of the sealing resin portion 6 is filled into the other through hole. The other through hole into which a part of the sealing resin portion 6 is filled has the function of the through hole 453 described in the second embodiment.

In this example, as shown in FIG. 6B, the protruding portion 45 and the mounting seat 56 are fastened by a bolt 59. The bolt 59 is not shown in FIG. 6A. The bolt 59 is inserted into the through hole 49 of the protruding portion 45 from the side of the opening 55 of the case 5 and screwed into the screw hole 57 of the mounting seat 56. A head part of the bolt 59 is located inwardly of the opening 55 of the case 5. Thus, the head part of the bolt 59 does not project from the opening 55 of the case 5. In this example, the head part of the bolt 59 is embedded in the sealing resin portion 6 and not exposed from the sealing resin portion 6.

In the reactor 1C of the third embodiment, the assembly 10 can be firmly fixed to the case 5 by fastening the protruding portion 45 of the holding member 41 to the mounting seat 56. Thus, the detachment of the assembly 10 from the case 5, for example, due to an impact, vibration or the like can be avoided in the reactor 1C. Further, in this example, the mounting seat 56 is formed to extend along the inner surface of the short side part 531 from the bottom plate portion 51. Since the mounting seat 56 is present in the case 5 in the reactor 1C, a volume of the case 5 is smaller as compared to the reactor 1A of the first embodiment. Thus, a used amount of the resin, which will become the sealing resin portion 6, is reduced in the reactor 1C than in the reactor 1A. Therefore, the manufacturing cost of the reactor 1C can be reduced by as much as the used amount of the resin, which will become the sealing resin portion 6, is reduced.

Fourth Embodiment

A reactor 1D according to a fourth embodiment is described with reference to FIGS. 8A and 8B. The reactor 1D has a basic configuration similar to that of the reactor 1A of the first embodiment. The reactor 1D of the fourth embodiment differs from the reactor 1A of the first embodiment in that an outer wall portion 40 of a holding member 41 includes projections 47, 48. The following description is centered on points of difference from the first embodiment and similar matters are not described.

Figure 8A:
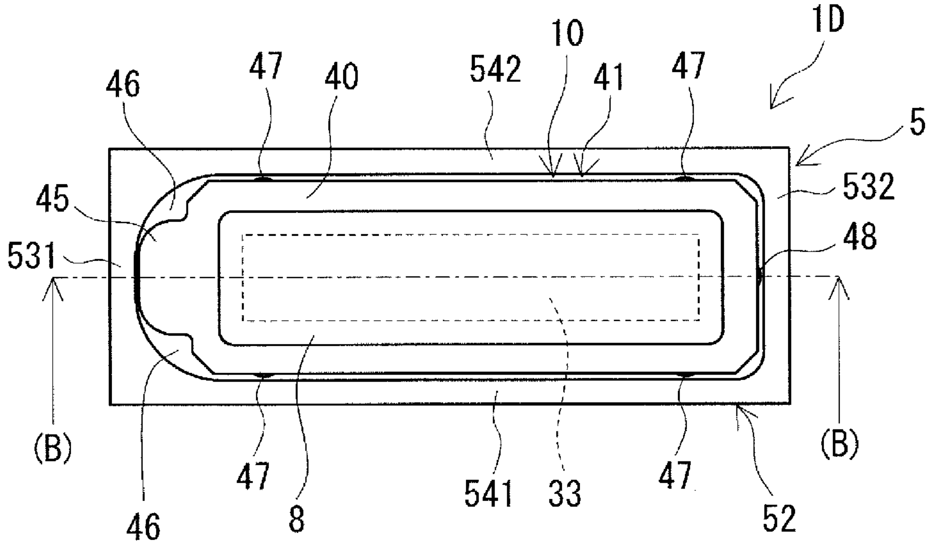
FIG. 8A is a schematic plan view of a reactor according to a fourth embodiment.
Figure 8B:
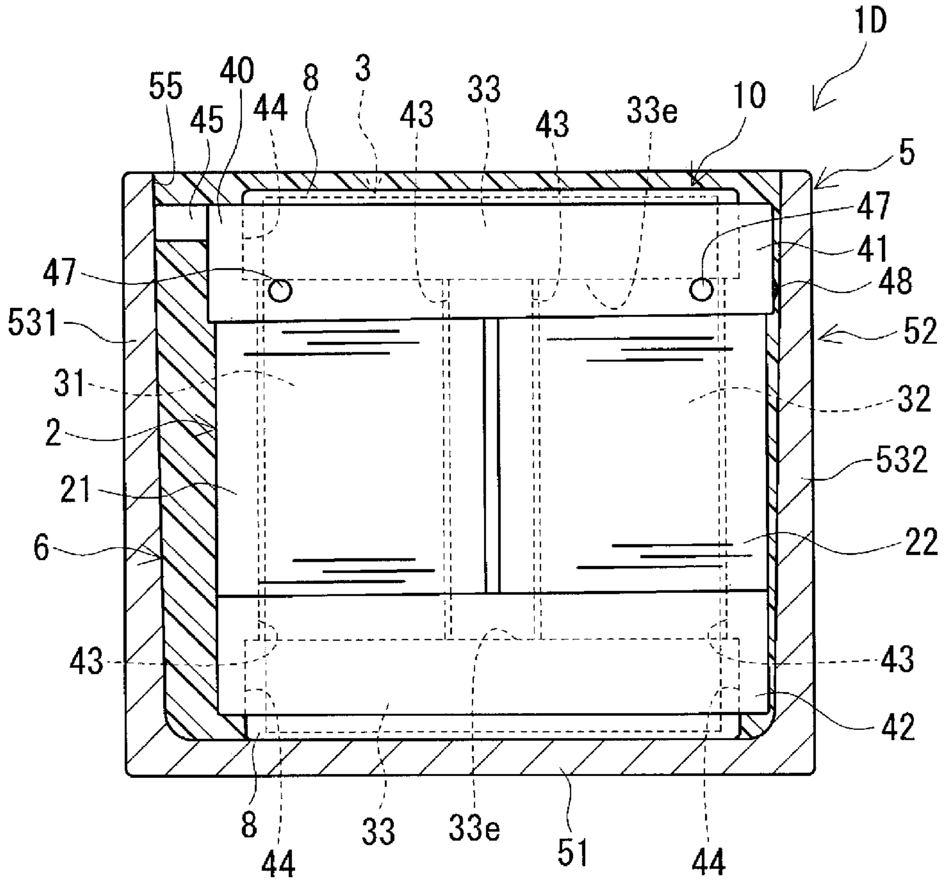
FIG. 8B is a schematic partial side view in section of the reactor according to the fourth embodiment.

FIG. 8B is a partial section along B-B in FIG. 8A. FIG. 8B shows the appearance of an assembly 10 in a case 5 viewed from the side of a side surface as in FIG. 1B and shows cross-sections of the case 5 and a sealing resin portion 6 cut by a plane parallel to the side surface.

Projections

The projections 47, 48 are provided to project toward the inner peripheral surface of the case 5 from the outer wall portion 40 as shown in FIGS. 8A and 8B. First projections 47 are provided on surfaces facing long side parts 541, 542 of the case 5. A second projection 48 is provided on a surface facing a short side part 532 of the case 5. That is, the second projection 48 is provided on the surface of the outer wall portion 40 facing a protruding portion 45.

The number, positions and shapes of the projections 47, 48 are not particularly limited and can be appropriately selected. For example, one projection 47 may be provided or a plurality of the projections 47 may be provided. In this example, two first projections 47 are provided at an interval in a length direction on each of the surfaces of the outer wall portion 40 facing the both long side parts 541, 542 as shown in FIG. 8A. Further, one second projection 48 is provided in a widthwise center on the surface of the outer wall portion 40 facing the short side part 532. The projections 47, 48 have a semispherical shape. Projection amounts of the projections 47, 48 can be appropriately set according to intervals between the outer peripheral surface of the outer wall portion 40 and the long side parts 541, 542 and the short side part 532 of a side wall portion 52. The projection amounts of the projections 47 may be, for example, 0.5 mm or more and 1.5 mm or less.

In the reactor 1D of the fourth embodiment, intervals between winding portions 21, 22 and the long side parts 541, 542 and an interval between the winding portion 22 and the short side part 532 are easily properly maintained by providing the projections 47, 48 on the outer wall portion 40. The projections 47, 48 may be in contact with the surfaces facing the outer wall portion 40. By the contact of the projections 47 with the respective inner surfaces of the long side parts 541, 542, the assembly 10 is easily positioned in a width direction with respect to the case 5. Further, by the contact of the projection 48 with the inner surface of the short side part 532, the assembly 10 is easily positioned in the length direction with respect to the case 5. Particularly, if the inner peripheral surface of the side wall portion 52 is inclined to widen from the side of a bottom plate portion 51 toward the side of an opening 55, excessive inclination of the assembly 10 in the case 5 can be suppressed by the contact of the projections 47, 48 with the respective inner surfaces of the long side parts 541, 542 and the short side part 532.

LIST OF REFERENCE NUMERALS

- 1A, 1B, 1C, 1D reactor
- 10 assembly
- 2 coil
  - 21, 22 winding portion
- 3 magnetic core
  - 31, 32 inner core portion
  - 33 outer core portion, 33*e* inner end surface
- 41, 42 holding member
  - 40 outer wall portion
  - 43 through hole, 44 recess
  - 45 protruding portion
  - 451 first surface, 452 second surface, 453 through hole
  - 46 clearance
  - 47, 48 projection
  - 49 through hole
  - 490 collar
- 5 case
  - 51 bottom portion
  - 52 side wall portion
  - 531, 532 short side part
  - 541, 542 long side part
  - 55 opening
  - 56 mounting seat
  - 57 screw hole
  - 59 bolt
- 6 sealing resin portion
  - 61 first resin portion, 62 second resin portion
  - 65 nozzle
- 8 molded resin portion

What is claimed is:

1. A reactor, comprising:
a coil including a pair of winding portions arranged in parallel;
a magnetic core to be arranged inside and outside the winding portions;
a holding member for specifying mutual positions of the coil and the magnetic core;
a case for accommodating an assembly including the coil, the magnetic core and the holding member; and
a sealing resin portion to be filled into the case,
wherein:
the case includes a bottom plate portion, the assembly being placed on the bottom plate portion, a side wall portion in the form of a rectangular tube for surrounding the assembly, and an opening facing the bottom plate portion,
the side wall portion includes a pair of long side parts facing each other and a pair of short side parts facing each other,
the assembly is so accommodated into the case that an axial direction of each winding portion is along a depth direction of the case,
the magnetic core includes an outer core portion to be arranged outside the winding portions and on the opening side,
the holding member includes an outer wall portion for covering at least a part of an outer peripheral surface of the outer core portion and a protruding portion projecting from the outer wall portion toward one of the short side parts, and
a clearance is provided between at least one of the long side parts and the protruding portion when the case is viewed from above.

2. The reactor of claim 1, wherein a tip of the protruding portion in a projecting direction is in contact with an inner surface of the short side part.

3. The reactor of claim 1, wherein:
the protruding portion has a first surface located on the bottom plate portion side, a second surface located on the opening side, and a hole penetrating through the first and second surfaces, and
the sealing resin portion includes a first resin portion to be filled into the hole and a second resin portion continuous with the first resin portion, the second resin portion being provided in contact with the first and the second surfaces.

4. The reactor of claim 1, wherein:
the short side part includes a mounting seat for supporting the protruding portion, and
the protruding portion and the mounting seat are fastened.

* * * * *